(12) United States Patent
Schneider et al.

(10) Patent No.: US 11,554,432 B2
(45) Date of Patent: Jan. 17, 2023

(54) DEVICE AND METHOD FOR ELECTROCHEMICALLY PROCESSING A MATERIAL

(71) Applicant: FRAUNHOFER-GESELLSCHAFT ZUR FÖRDERUNG DER ANGEWANDTEN FORSCHUNG E. V., Munich (DE)

(72) Inventors: Michael Schneider, Dresden (DE); Nils Junker, Dresden (DE)

(73) Assignee: Fraunhofer-Gesellschaft zur förderung der angewandten Forschung e.V., Munich (DE)

( * ) Notice: Subject to any disclaimer, the term of this patent is extended or adjusted under 35 U.S.C. 154(b) by 0 days.

(21) Appl. No.: 17/058,040

(22) PCT Filed: May 22, 2019

(86) PCT No.: PCT/EP2019/063242
§ 371 (c)(1),
(2) Date: Nov. 23, 2020

(87) PCT Pub. No.: WO2019/224262
PCT Pub. Date: Nov. 28, 2019

(65) Prior Publication Data
US 2021/0197302 A1    Jul. 1, 2021

(30) Foreign Application Priority Data
May 25, 2018 (DE) ..................... 10 2018 208 299.5

(51) Int. Cl.
*B23H 3/02* (2006.01)
*B23H 3/08* (2006.01)
(Continued)

(52) U.S. Cl.
CPC ............... *B23H 3/02* (2013.01); *B23H 3/08* (2013.01); *C25F 3/02* (2013.01); *C25F 7/00* (2013.01);
(Continued)

(58) Field of Classification Search
CPC ................................................. B23H 2300/10
See application file for complete search history.

(56) References Cited

U.S. PATENT DOCUMENTS 2,939,825 A    6/1960  Faust et al.

FOREIGN PATENT DOCUMENTS

GB    1093114 A  * 11/1967  ............... B23H 3/02

OTHER PUBLICATIONS

Schubert et al., "Electrochemical Machining of Cemented Carbides," *International Journal of Refractory Metals and Hard Materials* 47: 54-60 (2014).
(Continued)

*Primary Examiner* — Nicholas A Smith
(74) *Attorney, Agent, or Firm* — Leydig, Voit & Mayer, Ltd.

(57) ABSTRACT

The invention relates to a method and a device for electrochemically processing a material, which contains a hard phase and a binder phase. The method comprises preparing an aqueous, alkaline, complexing-agent-containing electrolyte and bringing the material to be processed into contact at least in part with the electrolyte and with a current source. In order to electrochemically oxidize the material, a pulsed electrical current is delivered to the material by means of the current source, the pulse sequence of the delivered electrical current being adjusted to the amount of the binder phase in the material to be processed. By means of the method and by means of the device, it is also possible to process materials having a high content of binder phase in such a way that
(Continued)

Figure 1:
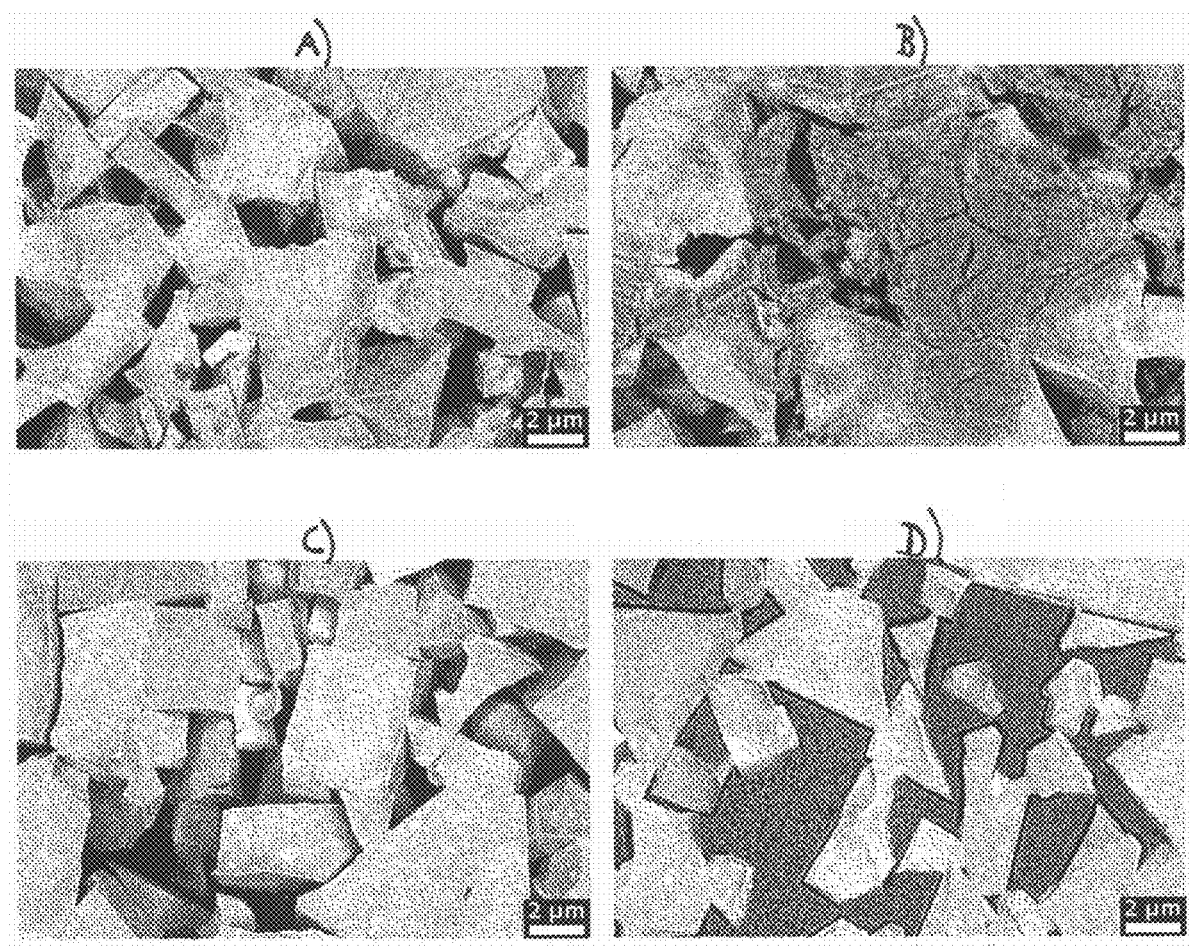

matter can be removed from the material evenly (homogeneously), i.e. both from the hard phase and from the binder phase of the material.

20 Claims, 2 Drawing Sheets

(51) Int. Cl.
*C25F 3/02* (2006.01)
*C25F 7/00* (2006.01)
*B23H 7/14* (2006.01)
*B23H 7/26* (2006.01)
*B23H 7/36* (2006.01)

(52) U.S. Cl.
CPC .............. *B23H 7/14* (2013.01); *B23H 7/265* (2013.01); *B23H 7/36* (2013.01); *B23H 2300/10* (2013.01)

(56) References Cited

OTHER PUBLICATIONS

European Patent Office, International Search Report in International Application No. PCT/EP2019/063242 (dated Aug. 23, 2019).
European Patent Office, Written Opinion in International Application No. PCT/EP2019/063242 (dated Aug. 23, 2019).
International Bureau of WIPO, International Preliminary Report on Patentability in International Application No. PCT/EP2019/063242 (dated Dec. 2, 2020).

\* cited by examiner

DEVICE AND METHOD FOR ELECTROCHEMICALLY PROCESSING A MATERIAL

CROSS-REFERENCE TO RELATED APPLICATIONS

This patent application is the U.S. national phase of International Application No. PCT/EP2019/063242, filed on May 22, 2019, which claims the benefit of German Patent Application No. 10 2018 208 299.5, filed May 25, 2018, the disclosures of which are incorporated herein by reference in their entireties for all purposes.

A method and a device for electrochemical machining of a material which comprises a hard phase and a binder phase are presented. The method comprises providing an aqueous, alkaline, complexing agent-containing electrolyte and at least partial contacting of the material to be machined with the electrolyte and with a current source. For electrochemical oxidation of the material, a pulsed electrical current is supplied to the material via the current source, the pulse sequence of the supplied electrical current being adjusted to the quantity of binder phase in the material to be machined. Via the method and via the device, it is possible to machine even materials with a high binder phase content such that a uniform (homogeneous) removal of material, i.e. both from the hard phase and from the binder phase of the material, is possible.

It is known that hard metal materials can be machined by a mechanical (cutting, grinding and polishing processes) and also by a thermal (discharge erosion and laser machining) route.

Because of the high hardness of this material class (HV10≈750 to 2,800), the mechanical machining primarily requires the cost-intensive use of diamond-coated tools and diamond-containing grinding means. With mechanical machining, a high energy input is exerted on the material. In the case of insufficient cooling, this can lead to a change in the material and hence to impairment of the material behaviour.

In particular, this danger of impairment to the material behaviour occurs during thermal machining processes. The removal caused by melting the material generally leaves behind a monophase, solidified melt, which has microcracks, on the hard metal material. In addition, the solidified melt also no longer has the advantages of a hard and simultaneously tough material which consists of hard phase and binder phase. Therefore, following the thermal machining, there is generally a final machining by mechanical polishing.

To date, with alloyed steels and also with nickel-based alloys, an electrochemical machining ("electrochemical machining", in short "ECM") is known.

In the case of electrochemical machining of hard metal materials, the problem exists however that the hard phase and binder phase are removed from the material in equal parts, i.e. producing a simultaneous anodic dissolving process for hard- and binder phase. Whilst the electrochemical dissolving of the hard phase (often consisting of a carbide, primarily tungsten carbide) is possible in the alkaline medium, for dissolving the binder phase (often consisting of a metal, primarily cobalt, nickel or iron) an acidic medium is required.

To date, a so-called bipolar pulsing with alternating current is known, which, because of the periodic pole reversal by the alternating current, leads to a periodic change in the pH value on the material surface. In fact, this enables an alternating, but not simultaneous, dissolving of the two-phase material. A further disadvantage in this method is that implementing bipolar modulated pulses requires a counter-electrode made of an inert material (e.g. graphite, platinum or gold) in order to avoid the anodic dissolving thereof during the positive polarisation phase.

In addition, it is known to use halogen-containing electrolyte solutions (e.g. electrolyte solutions with NaCl) during electrochemical machining of materials in order to effect a material removal on the hard metal material via the oxidising effect of the halogenide or the halogen gas thereof (e.g. Cl⁻ or chlorine). However, it is disadvantageous hereby that the result thereby is a very intensive, simultaneous dissolving of the binder phase since this is even dissolved preferably by an active electrochemical dissolving process. The result thereof is that the binder phase is dissolved faster than the hard phase and hence the latter is removed from the dissolving matrix in the form of particles. Hence a rough structure is left behind which usually must subsequently be polished mechanically in order to achieve the desired surface property.

If merely a purely alkaline electrolyte without halogenides is used (e.g. an aqueous solution of alkali hydroxides or alkali carbonates without halogenides), then this initially leads to a primarily anodic dissolving of the hard phase. In the further process course, an electron-conducting passive layer is however formed on the binder phase, which layer leads to an anodic decomposition of water and hence disturbs or entirely prevents material removal especially on the binder phase.

Starting herefrom, it was the object of the present invention to provide a method and a device for electrochemical machining of a material which comprises a hard phase and a binder phase, with the method and with the device an equally strong removal of the hard phase and of the binder phase of the material (i.e. a homogeneous removal of material) should be made possible over as long a period of time as possible.

The object is achieved by the features of the method and the device described herein, the use also described herein, and the advantageous developments thereof.

According to the invention, a method for electrochemical machining of a material which comprises a hard phase and a binder phase is provided. The method comprises the steps a) provision of an aqueous, alkaline electrolyte which includes an electrode which is connected to a first pole of a current source;

b) at least partial contacting of a material to be machined with the aqueous, alkaline electrolyte, the material comprising a hard phase and a binder phase;

c) electrical contacting of the material with a second pole of the current source;

d) supply of a pulsed electrical current to the material via the current source for electrochemical oxidation of the material, the pulsed current having a specific pulse sequence.

The method is characterised in that the electrolyte comprises a complexing agent which is suitable for complexing at least one metal ion of the binder phase, the pulse sequence of the pulsed current supplied by the current source being adjusted to the quantity of binder phase in the material to be machined (e.g. with the volume proportion of binder phase in the material).

According to the invention, it is prevented by the presence of the complexing agent in the electrolyte that an electron-conducting passive layer, which would stop the material removal, is formed on the binder phase in the process course. Hence, it is achieved by the complexing agent that the material removal on the hard phase and binder phase of the material can basically take place over a long period of time.

It was found in addition that the presence of the complexing agent alone is not sufficient to ensure an equally strong removal of material from the hard phase and the binder phase over a long period of time. In particular in the case of hard metal materials with a high binder phase content, a heterogeneous dissolving was observed. The reason for this is that the metal ions produced on the binder phase form a product film with water which cannot be removed by the complexing agent at the same speed at which it is formed.

The method according to the invention offers the solution for this problem by the electrical current being supplied in a pulsed manner to the material and the pulse sequence supplied by the current source during the method being adjusted to the quantity of binder phase in the material to be machined. By means of this measure, it is achieved that sufficient time is provided for the complexing agent in the electrolyte to complex the metal ions produced on the binder phase so that, during the material removal, no product film which could disturb the equilibrium between removal of the hard phase and removal of the binder phase can be formed.

In other words, the dissolving rate of hard- and binder phase can be adapted to each other via the method according to the invention so that a uniform (homogeneous) removal of both phases is made possible even with a high binder phase content. The combination of pulse-modulated polarisation of the current source and complexing agent in the electrolyte leads to a synergetic effect during the material removal. Coarse and fine machining of the material to be machined can be achieved in one process step, i.e. in contrast to EDM, no electrode exchange is necessary here. Compared with thermal machining processes of materials, the method according to the invention has the additional advantage that the material is cooled by the electrolyte (reinforced, e.g. by electrolyte convection and/or electrolyte rinsing) and hence the thermal energy input is so low that no surface-side melting of the material takes place and no crack formation due to solidification of a melt arises.

In the method, a material can be machined which comprises a hard phase which has a Vickers hardness HV10 of at least 750, preferably a Vickers hardness HV10 of 750 to 2,800, the hard phase comprising particularly preferably a hard metal, very particularly preferably a hard metal selected from the group consisting of tungsten carbide, titanium carbide, titanium nitride, tantalum carbide, niobium carbide, zirconium carbide, vanadium carbide and mixtures hereof, in particular tungsten carbide, or consisting thereof.

Furthermore, in the method, a material can be machined which comprises a binder phase which comprises a metal or consists thereof, which metal is suitable for forming a metal hydroxide in aqueous, alkaline solution by electrochemical oxidation, the metal preferably comprising a transition metal, particularly preferably cobalt, nickel, iron or mixtures hereof, in particular cobalt or consisting thereof.

In particular, the material is a hard metal material.

In a preferred embodiment of the method, an aqueous alkaline electrolyte which comprises a base is used, which base is selected from the group consisting of hydroxide, carbonate, ammonia, alcoholate, alcohol amine, silicate and mixtures hereof, the hydroxide being selected preferably from the group consisting of alkali metal hydroxide, alkaline earth metal hydroxide and mixtures hereof, particularly preferably selected from the group consisting of NaOH, KOH and mixtures hereof and/or the carbonate being selected preferably from the group consisting of alkali metal carbonate, alkaline earth metal carbonate and mixtures hereof, particularly preferably selected from the group consisting of $Na_2CO_3$, $K_2CO_3$ and mixtures hereof.

In the method, an aqueous, alkaline electrolyte can be used, which electrolyte comprises an additive for increasing the viscosity of the aqueous, alkaline electrolyte, preferably an additive selected from the group consisting of polyalcohols, alcohol amines and mixtures hereof. It can be achieved by using the additive that the machined material has a surface with lower roughness.

In a preferred embodiment, an aqueous, alkaline electrolyte which comprises no halogenide is used in the method. Such a method has the advantage that it can be implemented in a more eco-friendly way and represents a lower risk potential for the operators of the method since no halogen gases (e.g. chlorine or fluorine) are released from the electrolyte during the electrochemical machining.

The aqueous, alkaline electrolyte used in the method can be provided in a bath and can be circulated via at least one fluid inflow and at least one fluid outflow of the bath. This embodiment has the advantage that the location of the machining of the material can be cooled and substance removed from the material can be guided away speedily from the location of the machining.

Preferably, an aqueous, alkaline electrolyte which has a pH value of >13, in particular a pH value of ≥14 is used in the method. The advantage hereby is that an extremely high $OH^-$ concentration is present in the electrolyte, which ensures that the thermodynamic preconditions for avoiding oxide formation on the hard phase are present. Hence, the entire electrochemical control of the simultaneous removal is provided via the current-voltage regime.

In a preferred embodiment, an aqueous, alkaline electrolyte is used which has a temperature in the range of ≤60° C., preferably a temperature in the range of ≤50° C., particularly preferably a temperature in the range of >0° C. to 40° C., very particularly preferably a temperature in the range of 10° C. to 30° C. Preferably, the electrolyte is maintained at a temperature in the above-mentioned range during the method, in particular via a temperature-controlled unit for temperature-control of the electrolyte.

In the method, an electrode can be used which comprises a material or consists thereof, which material is selected from the group consisting of metal, metal alloy, carbon, electrically conductive plastic material and combinations hereof, the material being selected preferably from the group consisting of noble metal, copper, alloyed steel, graphite and combinations hereof.

Furthermore, an electrode (counterelectrode) can be used in the method which is mechanically oscillated, preferably synchronously with the pulse sequence of the pulsed current. By means of a mechanically oscillating counterelectrode which is synchronised with the pulse sequence, on the one hand a controlled electrode spacing, and, on the other hand, also an electrolyte convection, is made possible whereby a uniform removal of material with high precision can be achieved.

The current source used in the method can be a direct current source, preferably a pulsed direct current source, the electrode being connected in particular to a negative pole of the current source and the material being connected in particular to a positive pole of the current source.

There is intended by a direct current source, a current source, the electrodes of which have the same polarity, i.e. the electrodes of which are unipolar. The direct current source differs herein from the alternating current source, the electrodes of which have an alternating polarity, i.e. the electrodes of which are bipolar. The pulsed electrical current supplied by the direct current source in the method can have a rectangular shape, i.e. rectangular pulses are supplied.

The current source used in the method can be configured such that it supplies a voltage in the range of 0.1 to 50 V, preferably 2 to 40 V, particularly preferably 4 to 30 V, very particularly preferably 6 to 20 V, in particular 8 to 15 V.

Furthermore, the current source used in the method can be configured such that it supplies a current density in the range of max. 400 A/cm$^2$, preferably 1 A/cm$^2$ to 300 A/cm$^2$, particularly preferably 10 A/cm$^2$ to 200 A/cm$^2$, in particular 100 A/cm$^2$ to 150 A/cm$^2$.

Furthermore, the current source used in the method can be configured such that it supplies pulses with a pulse length in the range of max. 50 ms, preferably 0.1 ms to 50 ms, particularly preferably 1 ms to 40 ms, in particular 10 ms to 30 ms.

Apart from that, the current source used in the method can be configured such that it supplies pulses with a pulse pause between the pulses in the range of at least 0.1 ms, preferably 1 ms to 50 ms, particularly preferably 1 ms to 40 ms, in particular 10 ms to 30 ms.

In a preferred embodiment of the method, the complexing agent comprises a material which is selected from the group consisting of alcohol amine, alkyl carbonate, carboxylic acid, ammonia, inorganic ammonium salt, primary amine, secondary amine, tertiary amine and mixtures hereof, or consists thereof. Preferably, the complexing agent comprises an alcohol amine or consists thereof.

According to the invention, in addition a device for electrochemical machining of a material which comprises a hard phase and a binder phase is provided. The device comprises a) an aqueous, alkaline electrolyte, the aqueous, alkaline electrolyte contacting an electrode of a current source and being contactable (or contacting the latter) at least in regions with a material which comprises a hard phase and a binder phase; and b) a current source with a first pole which is connected electrically to the electrode and a second pole which can be connected electrically to the material (or is connected to the latter), the current source being configured to supply a pulsed electrical current with a specific pulse sequence to the material for electrochemical oxidation of the material.

The device is characterised in that the electrolyte comprises a complexing agent which is suitable for complexing at least one metal ion of the binder phase, the current source being configured to supply the pulsed current in a pulse sequence which is adjusted to the quantity of binder phase in the material to be machined.

The material can comprise a hard phase which has a Vickers hardness HV10 of at least 750, preferably a Vickers hardness HV10 of 750 to 2,800, the hard phase comprising particularly preferably a hard metal, very particularly preferably a hard metal selected from the group consisting of tungsten carbide, titanium carbide, titanium nitride, tantalum carbide, niobium carbide, zirconium carbide, vanadium carbide and mixtures hereof, in particular tungsten carbide, or consisting thereof.

In addition, the material can comprise a binder phase which comprises a metal or consists thereof, which metal is suitable for forming a metal hydroxide in aqueous, alkaline solution by electrochemical oxidation, the metal comprising preferably a transition metal, particularly preferably cobalt, nickel, iron or mixtures hereof, in particular cobalt, or consisting thereof.

In particular, the material is a hard metal material.

The aqueous, alkaline electrolyte can comprise a base which is selected from the group consisting of hydroxide, carbonate, ammonia, alcoholate, alcohol amine, silicate and mixtures hereof, the hydroxide being selected preferably from the group consisting of alkali metal hydroxide, alkaline earth metal hydroxide and mixtures hereof, particularly preferably selected from the group consisting of NaOH, KOH and mixtures hereof and/or the carbonate being selected preferably from the group consisting of alkali metal carbonate, alkaline earth metal carbonate and mixtures hereof, particularly preferably selected from the group consisting of $Na_2CO_3$, $K_2CO_3$ and mixtures hereof.

Furthermore, the aqueous, alkaline electrolyte can comprise an additive for increasing the viscosity of the aqueous, alkaline electrolyte, preferably an additive selected from the group consisting of polyalcohols, alcohol amines and mixtures hereof.

In a preferred embodiment, the aqueous, alkaline electrolyte comprises no halogenide.

The aqueous, alkaline electrolyte can be contained in a bath which has at least one fluid inflow and at least one fluid outflow and is configured to circulate the aqueous, alkaline electrolyte.

Preferably, the aqueous, alkaline electrolyte has a pH value of >13, in particular a pH value of ≥14. The advantage hereby is that an extremely high OH$^-$ concentration is present in the electrolyte, which ensures that the thermodynamic preconditions for avoiding oxide formation on the hard phase are present. Hence, the entire electrochemical control of the simultaneous removal is provided via the current-voltage regime.

In a preferred embodiment, the aqueous, alkaline electrolyte has a temperature in the range of ≤60° C., preferably a temperature in the range of ≤50° C., particularly preferably a temperature in the range of >0° C. to 40° C., very particularly preferably a temperature in the range of 10° C. to 30° C. This is associated with the advantage that no thermal decomposition of a component of the electrolyte (e.g. of the complexing agent) takes place and the material can be machined electrochemically with the device in a more stable procedural way. This advantage is increased even more if the device has a temperature-control unit for temperature-control of the electrolyte.

The electrode of the device can comprise a material or consist thereof, which material is selected from the group consisting of metal, metal alloy, carbon, electrically conductive plastic material and combinations hereof, the material being selected preferably from the group consisting of noble metal, copper, alloyed steel, graphite and combinations hereof.

Furthermore, the electrode of the device can be mechanically oscillatable, preferably synchronously with the pulse sequence of the pulsed current.

The current source of the device can be a direct current source, preferably a pulsed direct current source, the electrode being connected in particular to a negative pole of the current source and the material being connected in particular to a positive pole of the current source. The direct current source can be configured to supply a pulsed electrical current in rectangular form, i.e. rectangular pulses are supplied.

The current source of the device can be configured such that it supplies a voltage in the range of 0.1 to 50 V, preferably 2 to 40 V, particularly preferably 4 to 30 V, very particularly preferably 6 to 20 V, in particular 8 to 15 V.

Furthermore, the current source of the device can be configured such that it supplies a current density in the range of max. 400 A/cm², preferably 1 A/cm² to 300 A/cm², particularly preferably 10 A/cm² to 200 A/cm², in particular 100 A/cm² to 150 A/cm².

Furthermore, the current source of the device can be configured such that it supplies pulses with a pulse length in the range of max. 50 ms, preferably 0.1 ms to 50 ms, particularly preferably 1 ms to 40 ms, in particular 10 ms to 30 ms.

Apart from that, the current source of the device can be configured such that it supplies pulses with a pulse pause between the pulses in the range of at least 0.1 ms, preferably 1 ms to 50 ms, particularly preferably 1 ms to 40 ms, in particular 10 ms to 30 ms.

The complexing agent in the electrolyte of the device can comprise a material or consist thereof, which material is selected from the group consisting of alcohol amine, alkyl carbonate, carboxylic acid, ammonia, inorganic ammonium salt, primary amine, secondary amine, tertiary amine and mixtures hereof. Preferably, the complexing agent comprises an alcohol amine or consists thereof.

The use of the device according to the invention for electrochemical machining of a material is proposed.

On the basis of the subsequent Figures and of the subsequent example, the subject according to the invention is intended to be explained in more detail without wishing to restrict said subject to the specific embodiments illustrated here.

FIG. 1 shows four FESEM photographs (BSE) of material surfaces which were achieved by a different combination of pulse modulation and electrolyte composition. The machined material concerns WC30Co, i.e. a mixture of 70% by weight of tungsten carbide as hard phase and 30% by weight of cobalt as binder phase. A direct voltage of 11 volts was used. FIGS. 1A and 1B show the machining in an alkaline electrolyte without complexing agent for complexing a metal ion of the binder phase. In FIG. 1A, the result of a machining of WC30Co with unpulsed direct current is illustrated, whereas FIG. 1B illustrates the result of a machining of WC30Co with pulsed direct current. In the case of the result illustrated in FIG. 1C, in fact an electrolyte with complexing agent was used, but only unpulsed direct current in the machining. FIG. 1D alone shows the result of a machining according to the invention of WC30Co since the WC30Co was subjected here to a complexing agent-containing electrolyte and was machined with pulsed direct current.

Figure 2:
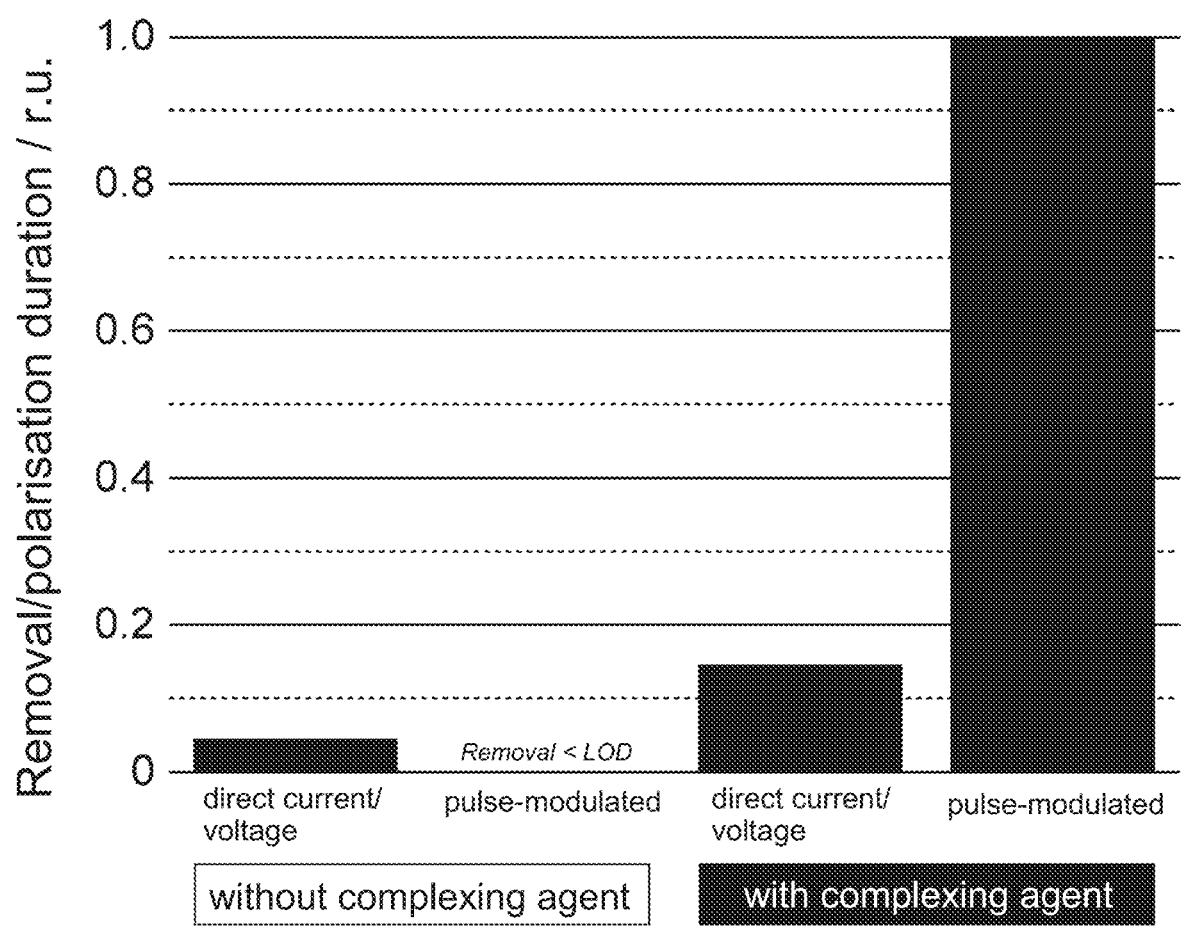

FIG. 2 illustrates the difference of the material removal on the hard metal as a function of the use of a complexing agent in the electrolyte and as a function of the type of direct current ("pulse-modulated" stands for pulsed direct current and "direct current/voltage" stands for unpulsed direct current).

EXAMPLE—METHOD FOR ELECTROCHEMICAL MACHINING OF A HARD METAL MADE OF TUNGSTEN CARBIDE AND COBALT

In the following, the chemical reactions during the anodic dissolving of a hard metal material, which comprises tungsten carbide (WC) as hard phase and cobalt as binder phase, in an aqueous, alkaline electrolyte are described.

It should hereby be assumed that the hard phase is oxidised via reaction (1) to form tungstenate and carbon dioxide (Schubert et al. (2014) Int. Journal of Refractory Metals and Hard Materials, issue 47, p. 54-60).

$$WC + 7H_2O \rightarrow WO_4^{2-} + CO_3^{2-} + 14H^+ + 10e^- \quad (1)$$

As a result of the transpassive dissolving of WC, a fourteen-fold material quantity of protons per WC unit are generated from the decomposition of the water.

Furthermore, it should be assumed that also the dissolving of the binder phase is effected transpassively, the process in this case being two-stage. In the alkaline medium, a thin, electron-conducting cobalt(II)hydroxide layer is firstly formed on the binder phase via reaction (2):

$$Co + 2H_2O \rightarrow Co(OH)_2 + 2H^+ + 2e^- \quad (2)$$

This passive layer is insoluble in the alkaline medium so that, on this, water would be converted into oxygen readily via reaction (3):

$$2H_2O \rightarrow O_2 + 4H^+ + 4e^- \quad (3)$$

A local acidification, i.e. a local increase in the $H^+$ concentration, could dissolve the passive layer according to reaction (4):

$$Co(OH)_2 + 2H^+ \rightarrow Co^{2+} + 2H_2O \quad (4)$$

In fact, the oxidation of hard- and binder phase leads to the electrolyte solution becoming acidified locally on the interface to the material (see reactions (1) and (2) above). In the practical implementation of the method, such a local acidification is however prevented by the electrolyte convection which is necessary for the removal process and hence unavoidable: by means of the electrolyte convection, the interface to the material is permanently alkalised and therefore does not reach the necessary $H^+$ concentration for dissolving the passive layer.

Therefore, in the method according to the invention and in the device according to the invention, an electrolyte is used, which electrolyte complexes and hence dissolves the metal ion of the passive layer (i.e. of the oxidised binder phase), for example via reaction (5), (complexing agent here is $NH_3$):

$$Co(OH)_2 + 6NH_3 \rightarrow [Co(NH_3)_6]^{2+} + 2OH^- \quad (5)$$

The complexing of the metal ions from the hydroxide layer is however subjected to a specific speed.

In order to adjust the removal speeds of hard- and binder phase with each other, a temporal interruption in the anodic dissolving process is therefore necessary. This is achieved according to the invention by the current source supplying a pulsed electrical current to the material and the pulse sequence, supplied by the current source, of the pulsed current being adjusted to the quantity of binder phase in the material to be machined.

By means of such a pulse-modulated polarisation of the material with a suitable adjustment of the pulse-polarisation-specific parameters, consisting of pulse duration $<t_{on}>$ and pulse pause $<t_{off}>$ and also the voltage amplitudes $<U_{on}>$ during the pulse or current amplitudes $<I_{on}>$ during the pulse and the voltage pauses $<U_{off}>$ or current pauses $<I_{off}>$, the removal process can be adapted to the respective material properties (e.g. binder phase content, particle size of the hard phase). A bipolar modulation of voltage or current (i.e. alternating current) is not required because of the complexing additive.

The invention claimed is:

1. A method for electrochemical machining of a material which comprises a hard phase and a binder phase, comprising the steps of:

(a) providing an aqueous, alkaline electrolyte which includes an electrode which is connected to a first pole of a direct current source;
(b) at least partially contacting the material to be machined with the aqueous, alkaline electrolyte, the material comprising the hard phase and the binder phase;
(c) electrically contacting the material with a second pole of the direct current source; and
(d) supplying a pulsed electrical current to the material via the direct current source for electrochemical oxidation of the material, the pulsed current having a specific pulse sequence;
wherein the electrolyte comprises a complexing agent which is suitable for complexing at least one metal ion of the binder phase,
wherein the pulse sequence of the pulsed current supplied by the direct current source is adjusted to the quantity of binder phase in the material to be machined in a manner that sufficient time is provided for the complexing agent in the electrolyte to complex the metal ions produced on the binder phase so that, during the material removal, no product film which could disturb the equilibrium between removal of the hard phase and removal of the binder phase can be formed and a uniform removal of both phases is made possible.

2. The method according to claim 1, wherein a material is machined, wherein
(i) the hard phase has a Vickers hardness HV10 of at least 750,
and/or
(ii) the binder phase comprises a metal which is suitable for forming a metal hydroxide in aqueous, alkaline solution by electrochemical oxidation.

3. The method according to claim 2, wherein the hard phase comprises a hard metal.

4. The method according to claim 3, wherein the hard metal is a transition metal.

5. The method according to claim 2, wherein the hard phase is selected from the group consisting of tungsten carbide, titanium carbide, titanium nitride, tantalum carbide, niobium carbide, zirconium carbide, vanadium carbide and mixtures thereof.

6. The method according to claim 1, the aqueous alkaline electrolyte comprises:
a base which is selected from the group consisting of hydroxide, carbonate, ammonia, alcoholate, alcohol amine, silicate and mixtures thereof; and/or
an additive for increasing the viscosity of the aqueous, alkaline electrolyte; and/or
no halogenide.

7. The method according to claim 6, wherein the hydroxide is selected from the group consisting of alkali metal hydroxide, alkaline earth metal hydroxide, and mixtures thereof and/or the carbonate is selected from the group consisting of alkali metal carbonate, alkaline earth metal carbonate, and mixtures thereof.

8. The method according to claim 1, wherein the aqueous, alkaline electrolyte is provided in a bath and the aqueous, alkaline electrolyte is circulated via at least one fluid inflow and at least one fluid outflow of the bath.

9. The method according to claim 1, wherein the electrode comprises a material selected from the group consisting of metal, metal alloy, carbon, electrically conductive plastic material and combinations thereof; and/or
is mechanically oscillated.

10. The method according to claim 1, wherein the direct current source is configured such that it
(i) supplies a voltage in the range of 0.1 to 50 V; and/or it supplies a current density in the range of maximally 400 A/cm$^2$;
(ii) supplies pulses with a pulse length in the range of max. 50 ms; and/or
(iii) supplies pulses with a pulse pause between the pulses in the range of at least 0.1 ms.

11. The method according to claim 1, wherein the complexing agent comprises a material selected from the group consisting of alcohol amine, alkyl carbonate, carboxylic acid, ammonia, inorganic ammonium salt, primary amine, secondary amine, tertiary amine, and mixtures thereof.

12. A device for electrochemical machining of a material which comprises a hard phase and a binder phase, comprising
(a) an aqueous, alkaline electrolyte, the aqueous, alkaline electrolyte contacting an electrode of a direct current source and being contactable at least in regions with the material which comprises the hard phase and the binder phase; and
(b) the direct current source with a first pole which is connected electrically to the electrode and a second pole which can be connected electrically to the material, the direct current source being adjusted to supply a pulsed electrical current with a specific pulse sequence to the material for electrochemical oxidation of the material;
wherein the electrolyte comprises a complexing agent which is suitable for complexing at least one metal ion of the binder phase,
wherein the direct current source is configured to supply the pulsed current in a pulse sequence which is adjusted to the quantity of binder phase in the material to be machined in a manner that sufficient time is provided for the complexing agent in the electrolyte to complex the metal ions produced on the binder phase so that, during the material removal, no product film which could disturb the equilibrium between removal of the hard phase and removal of the binder phase can be formed and a uniform removal of both phases is made possible.

13. The device according to claim 12, wherein
(i) the hard phase has a Vickers hardness HV10 of at least 750;
and/or
(ii) the binder phase comprises a metal suitable for forming a metal hydroxide in aqueous, alkaline solution by electrochemical oxidation.

14. The device according to claim 12, wherein the aqueous, alkaline electrolyte
(i) comprises a base selected from the group consisting of hydroxide, carbonate, ammonia, alcoholate, alcohol amine, silicate and mixtures thereof; and/or
(ii) comprises an additive for increasing the viscosity of the aqueous, alkaline electrolyte; and/or
(iii) comprises no halogenide.

15. The device according to claim 13, wherein the hard phase comprises a hard metal.

16. The device according to claim 13, wherein the hard phase is selected from the group consisting of tungsten carbide, titanium carbide, titanium nitride, tantalum carbide, niobium carbide, zirconium carbide, vanadium carbide, and mixtures thereof.

17. The device according to claim 12, wherein the aqueous, alkaline electrolyte is contained in a bath which has at least one fluid inflow and at least one fluid outflow and is configured to circulate the aqueous, alkaline electrolyte.

18. The device according to claim 12, wherein the electrode
   (i) comprises a material selected from the group consisting of metal, metal alloy, carbon, electrically conductive plastic material and combinations thereof; and/or
   (ii) is mechanically oscillatable.

19. The device according to claim 12, wherein the direct current source
   (i) is configured such that it supplies a voltage in the range of 0.1 to 50 V; and/or
   (ii) is configured such that it supplies a current density in the range of max. 400 A/cm$^2$; and/or
   (iii) is configured such that it supplies pulses with a pulse length in the range of max. 50 ms; and/or
   (iv) is configured such that it supplies pulses with a pulse pause between the pulses in the range of at least 0.1 ms.

20. The device according to claim 12, wherein the complexing agent comprises a material selected from the group consisting of alcohol amine, alkyl carbonate, carboxylic acid, ammonia, inorganic ammonium salt, primary amine, secondary amine, tertiary amine and mixtures thereof.

\* \* \* \* \*